No. 839,258.
PATENTED DEC. 25, 1906.
A. O. BENECKE.
SCALE PLATE.
APPLICATION FILED MAR. 31, 1906.
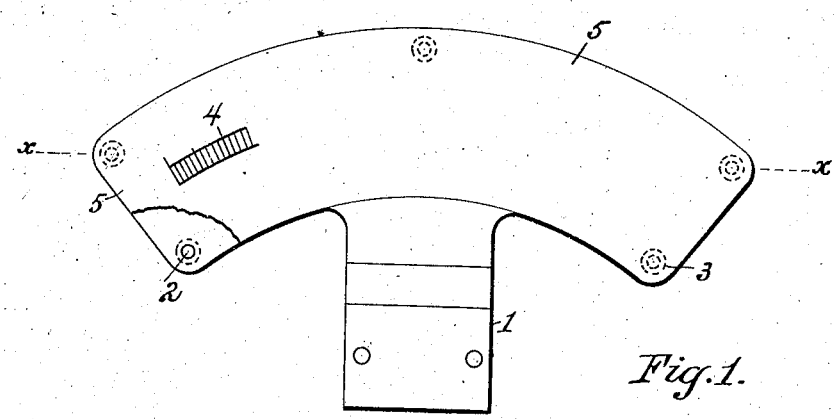
Fig. 1.
Fig. 2.
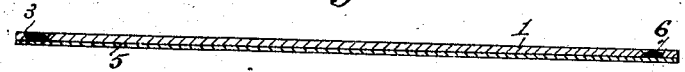
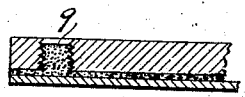
Fig. 3.
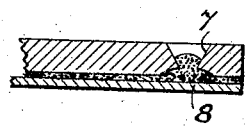
Fig. 4.
WITNESSES
Guy J. Edwards
D. A. Alliston
INVENTOR
Adelbert O. Benecke
BY
Fischer & Sanders.
ATTORNEYS.

UNITED STATES PATENT OFFICE.

ADELBERT O. BENECKE, OF NEWARK, NEW JERSEY, ASSIGNOR TO AMERICAN INSTRUMENT COMPANY, OF NEWARK, NEW JERSEY, A CORPORATION OF NEW JERSEY.

SCALE-PLATE.

No. 839,258.

Specification of Letters Patent.

Patented Dec. 25, 1906.

Application filed March 31, 1906. Serial No. 309,069.

*To all whom it may concern:*

Be it known that I, ADELBERT O. BENECKE, residing in the city of Newark, in the county of Essex and State of New Jersey, have invented a new and useful Scale-Plate, of which the following is a full and complete description, such as will enable others skilled in the art to which it pertains to make and use the same.

My invention relates to scale or dial plates; and its object is to improve the construction of such scale-plates, whereby the cost may be reduced to a minimum and liability to warp or become distorted through the changes in atmospheric temperature or humidity may be quite effectually obviated.

Scale-plates made in accordance with my invention are particularly adapted for use in connection with measuring instruments of various kinds—such as barometers, thermometers, electrical measuring instruments, and the like—where changes are indicated by means of a pointer passing over the face of a scale and operated by some moving part of the instrument itself.

In carrying out my invention I make use of the structure illustrated in the accompanying drawings, in which—

Figure 1 is a plan view of a scale-plate made in accordance with my invention and illustrating the method of applying the scale to the metal base-plate, and Fig. 2 is a cross-section on line *x x* of Fig. 1, and Figs. 3 and 4 illustrate modifications.

Similar reference-numerals refer to like parts in the figures.

The metal plate 1 is cut out of sheet metal or other suitable material in the shape indicated or in any other form convenient for use in the particular instrument to which my scale-plate is applied. This metal plate is provided with a series of marginal apertures 2, countersunk, as indicated at 3 in Fig. 2. The scale 4 is printed or drawn upon a sheet of thick paper, thin cardboard, or other material suitable for use in this relation, and the material is cut to conform to the general contour of the metal base 1, as indicated. Adhesive material is applied to the back of the scale-sheet 5, and while still moist the paper thus prepared is applied to the face of the metal base 1 and pressed firmly upon said base, so that the excess of adhesive material is made to ooze through the countersunk holes 3, where upon thoroughly drying it forms into the headed bulbs 6 upon the back of said plate, and thus firmly secures the scale-sheet 5 to the metal base. As an adhesive material I ordinarily employ a special composition of which the base is shellac, inasmuch as such composition is not affected by moisture.

In Fig. 4 I have illustrated a slight modification, in which I countersink both sides of the base-plate, as at 7 and 8. This gives the larger body of the cementitious material in the countersunk space, which under some circumstances is more desirable than to countersink one side alone.

I may utilize old base-plates wherein the scale-sheets have been held in position by means of screws threaded into apertures in the base-plate. This is illustrated in Fig. 3 at 9. The screw-threads form admirable holding means for the adhesive material forced therein in the act of pressing the scale-sheet home upon the base-plate. I am thus enabled to apply this scale-sheet directly to the base-plate without the necessity of countersinking the rear ends of the apertures. In constructing new base-plates, however, it is immaterial whether the apertures are screw-threaded or countersunk, as illustrated in the several figures. However, I prefer to countersink the apertures of the base-plate rather than screw-thread them, inasmuch as such countersinking can be done more rapidly than screw-threading them.

It will thus be seen that I have provided a form of scale-plates wherein the scale-sheet is mounted upon a metallic base or base of any other suitable material in such a manner that the use of screws or other projections upon the face of the scale-plate, which might interfere with the free movement of the indicating-needle, is entirely obviated, while the materials used are of such a character as not to be affected by the surrounding temperature or the humidity in the atmosphere.

I do not wish to be understood as claiming the specific form or shape of scale-plate as illustrated in the drawings, as my invention is capable of application to scale-plates of any form.

The main feature of the invention resides in the method of applying the scale itself to the base-plate so as to obviate the use of screws or rivets for holding the same in position, while at the same time the construction of the countersunk apertures 2 is such as to firmly clench the adhesive material and avoid any liability of the scale-sheet itself breaking away from the base-plate.

I claim—

1. An improved scale-plate, comprising a metal base-plate having a series of marginal apertures, a scale-sheet secured to said base-plate by means of an adhesive material applied to the rear surface of said sheet and pressed against the front of said base-plate to force the adhesive material adjacent to said apertures into the same.

2. An improved scale-plate comprising a metal base-plate having a series of marginal countersunk apertures, and a paper scale-sheet adhesively secured to said base-plate through said marginal countersunk apertures by means of cementitious material.

3. An improved scale-plate comprising a base-plate having a series of marginal countersunk apertures, and a scale-sheet affixed to the face of said base-plate by means of an adhesive material which fills said countersunk apertures.

4. An improved scale-plate comprising a base-plate having a series of marginal apertures countersunk upon the rear side of the plate, and a scale-sheet secured to said base-plate by means of cementitious material applied to the back of the scale-sheet and forced into said countersunk marginal apertures.

This specification signed and witnessed this 29th day of March, 1906.

ADELBERT O. BENECKE.

Witnesses:
    LOUIS M. SANDERS,
    W. A. LA MOTT.